United States Patent
Qian et al.

(10) Patent No.: US 7,355,997 B2
(45) Date of Patent: Apr. 8, 2008

(54) DATA RATE SHIFTING METHODS AND TECHNIQUES

(75) Inventors: Lu Qian, Solon, OH (US); Michael E. Lewis, Hartville, OH (US)

(73) Assignee: Cisco Technology, Inc., San Jose, CA (US)

( * ) Notice: Subject to any disclaimer, the term of this patent is extended or adjusted under 35 U.S.C. 154(b) by 635 days.

(21) Appl. No.: 10/841,781

(22) Filed: May 7, 2004

(65) Prior Publication Data

US 2005/0249157 A1 Nov. 10, 2005

(51) Int. Cl.
 *H04Q 7/00* (2006.01)
(52) U.S. Cl. ...................................................... 370/328
(58) Field of Classification Search ...................... None
See application file for complete search history.

(56) References Cited

U.S. PATENT DOCUMENTS

| | | | |
|---|---|---|---|
| 5,070,536 A | | 12/1991 | Mahany et al. |
| 5,216,427 A | | 6/1993 | Yan et al. |
| 5,943,610 A | * | 8/1999 | Endo ........................... 455/69 |
| 6,067,646 A | * | 5/2000 | Starr ........................... 714/701 |
| 6,317,224 B1 | * | 11/2001 | Lutgen et al. ............... 370/464 |
| 6,700,881 B1 | * | 3/2004 | Kong et al. .................. 370/335 |
| 6,760,882 B1 | | 7/2004 | Catreux et al. |
| 6,859,642 B2 | | 2/2005 | Schwarz et al. |
| 6,993,689 B2 | | 1/2006 | Nagai et al. |
| 2002/0105925 A1 | * | 8/2002 | Shoemake .................. 370/330 |
| 2003/0078006 A1 | | 4/2003 | Mahany |
| 2003/0086371 A1 | | 5/2003 | Walton et al. |
| 2004/0133837 A1 | * | 7/2004 | Varma et al. ................ 714/749 |
| 2005/0041581 A1 | * | 2/2005 | Kuusinen et al. ........... 370/230 |
| 2005/0136844 A1 | * | 6/2005 | Giesberts et al. ........ 455/67.13 |
| 2005/0268181 A1 | * | 12/2005 | Murty et al. ................. 714/704 |

* cited by examiner

*Primary Examiner*—Anh-Vu Ly
(74) *Attorney, Agent, or Firm*—Tucker Ellis & West LLP

(57) ABSTRACT

A technique for determining when to change a data rate by determining the cause of packet loss. The technique distinguishes between collision mediated packet loss and poor signal mediated packet loss. Rate shifting to a lower rate is performed after determining poor signals are causing packet loss. After switching to a lower rate, the packet loss rate can be compared to the pre-switch packet loss rate. If the packet loss rate has not improved by shifting to a lower data rate, then the data rate can be shifted to a higher rate. The technique can use a combination of channel response, signal strength, packet loss rate and throughput to determine when to switch data rates. A communication unit can maintain separate histories for each unit it is communicating with and employ a different data rate for each unit.

33 Claims, 5 Drawing Sheets

DATA RATE SHIFTING METHODS AND TECHNIQUES

BACKGROUND OF THE INVENTION

The present invention relates generally to communications and more particularly to methods for rate shifting to improve network performance and implementations of the aforesaid methods.

Data rate shifting is a common mechanism to ensure a reliable wireless link. There are many ways that a wireless link can become degraded (e.g., noise, multipath, fading, interference, etc.). As the link is degraded it becomes increasingly difficult to operate the link at higher data rates because corrupted packets and the subsequent retries consume much of the available bandwidth. A reduction in the data rate is often effective in restoring the quality of the link since the lower data rates can accommodate greater corruptions to the link.

Rate-shifting can be based on the number of packet retries. As the number of packet retries increases, or reaches a certain threshold, the data rate can be reduced. However, a problem with this technique is that packet loss due to collisions are interpreted the same as packet loss due to a poor channel, interference, or large amounts of noise. Packet collisions within the network under normal operation with large numbers of clients and heavy traffic load can also cause packets to become corrupted. If the packet loss is due to collisions, then rate shifting to a reduced data rate is not effective and may severely reduce network performance since lower data rates increase a packet's transmission time and therefore its collision probability.

BRIEF SUMMARY OF THE INVENTION

The present invention in accordance with various aspects is directed to a rate shifting technique that differentiates between packet loss due to poor signal quality and packet loss due to collisions under normal operation with a large number of clients. The present invention further contemplates a rate shifting algorithm that employs one or more of signal strength measurement, signal quality measurement, channel quality, packet loss rate and throughput to differentiate between packet loss due to signal quality and packet loss due to packet collisions. An aspect of the present invention is that it can avoid needless rate shifting and the subsequent reduction in throughput.

A method to optimize communications is disclosed herein in accordance with an aspect of the present invention. The method monitors a performance parameter of a link, such as packet loss rate, throughput rate, or both. The method also monitors signal quality of a link. The method comprises switching to a lower data rate after the performance parameter indicates a decrease in performance and a corresponding degradation of signal quality. The performance parameter that indicates a decrease in performance is either the throughput rate decreasing, the packet loss rate increasing or both. Optionally, the method can further comprise continuing to monitor the performance parameter after switching to the lower data rate, comparing the performance parameter after switching to the lower data rate with the performance parameter before switching to the lower data rate and switching to a higher date rate after the comparison determines that the performance parameter after switching to the lower data rate did not improve by a predetermined threshold.

In accordance with an aspect of the present invention there is disclosed herein a method for optimizing communications. The method comprises maintaining a history of channel quality of a successfully received packet, maintain a history of received signal strength of the successfully received packet and maintaining a history of packet loss rate. The method further comprises switching to a lower data rate after the history of packets loss rate indicates an increase in a rate of packets lost and at least one the received signal strength is decreasing below a first predetermined threshold and the channel quality is below a second predetermined threshold. The method can further comprise comparing the packet loss rate of the lower data rate to the history of the packet lost rate and if the packet loss rate of the lower data rate is greater than a predetermined threshold, switching to a higher data rate.

In accordance with another aspect of the present invention, there is disclosed herein a communication device having a pre-determined data rate for communicating with at least one other communication device. The communication device comprising a rate shifting module configured to decrease the data rate of the communication device after detecting an increased packet loss rate and decreased channel quality and signal strength. Optionally, the device can compare the packet loss rate at the decreased data rate with the packet rate before changing to the decreased data rate and can switch to a high data rate if the packet loss rate did not improve at the decreased data rate.

In accordance with an aspect of the present invention, there is disclosed herein a communication device comprising means for measuring packet loss rate and means for monitoring channel quality. The communication device further comprises means for changing a data rate responsive to the means for measuring packet loss rate and the means for monitoring channel quality.

Still other objects and features of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

DETAILED DESCRIPTION OF INVENTION

Throughout this description, the preferred embodiment and examples shown should be considered as exemplars, rather than limitations, of the present invention. The present invention a rate shifting technique that determines the reason for packet loss. In accordance with an aspect of the present invention, the present invention can differentiate whether packet loss is caused by poor signal quality or by packet collisions.

In accordance with an aspect of the present invention there is described herein a rate shifting algorithm employing at least one of signal strength, channel quality, packet loss rate and throughput to differentiate between packet loss due to packet collisions and packet loss due to poor signal quality.

In accordance with an aspect of the present invention, there is described herein a method for rate shifting. A transceiver can keep a history of the channel quality and the received signal strength of each successfully received packet and the number of packets lost. Based on the history, the receiver can then make a more reasonable assumption about the reason for its present packet loss. For example, if recent history indicates that the received packets have been of adequate signal strength and signal quality, then it is reasonable to assume that the current packet loss was due to a packet collision. This process can be quantified by setting a threshold for packet loss, signal strength and signal quality. Should the threshold be exceeded then rate shifting would occur. Different thresholds can be selected for each data rate. The threshold values can be selected to introduce some hysteresis to prevent excessive rate-shifting. The present invention can be implemented with a Bayesian based machine learning method where the two models to be compared are packet loss due to collision and packet loss due to poor signal quality. It can also be based on a method using a simple comparison to predetermined threshold.

After rate shifting, the current loss of packets and/or effective throughput can be compared to the packet loss and/or effective throughput prior to rate shifting. If the comparison yields that these measures are the same or worse, then the rate can be shifted back to a higher rate since no advantage was obtained by switching to the lower rate.

For 802.11a and 802.11g networks, the signal strength can be easily obtained. The signal quality can be derived from the channel estimate for an Orthogonal Frequency Domain Modulation (OFDM) (e.g., 802.11a) network. Determining signal quality for DSSS modulation can be accomplished by the width of the Barker correlation peak. Determining throughput and packet loss can be accomplished within the Media Access Control (MAC) by simply recording these data.

Figure 1:
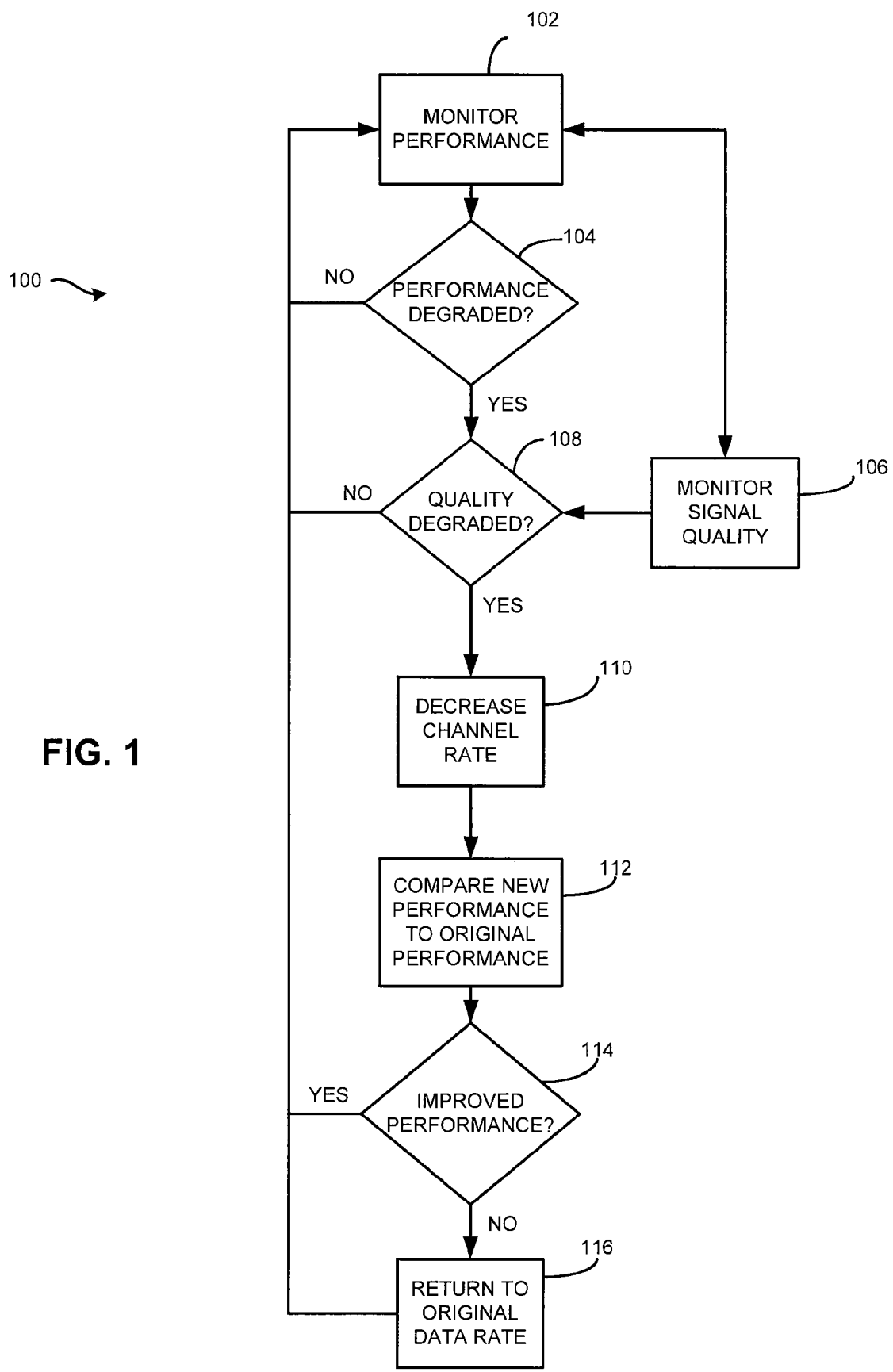
FIG. 1 is a block diagram illustrating a method in accordance with an aspect of the present invention.
Figure 2:
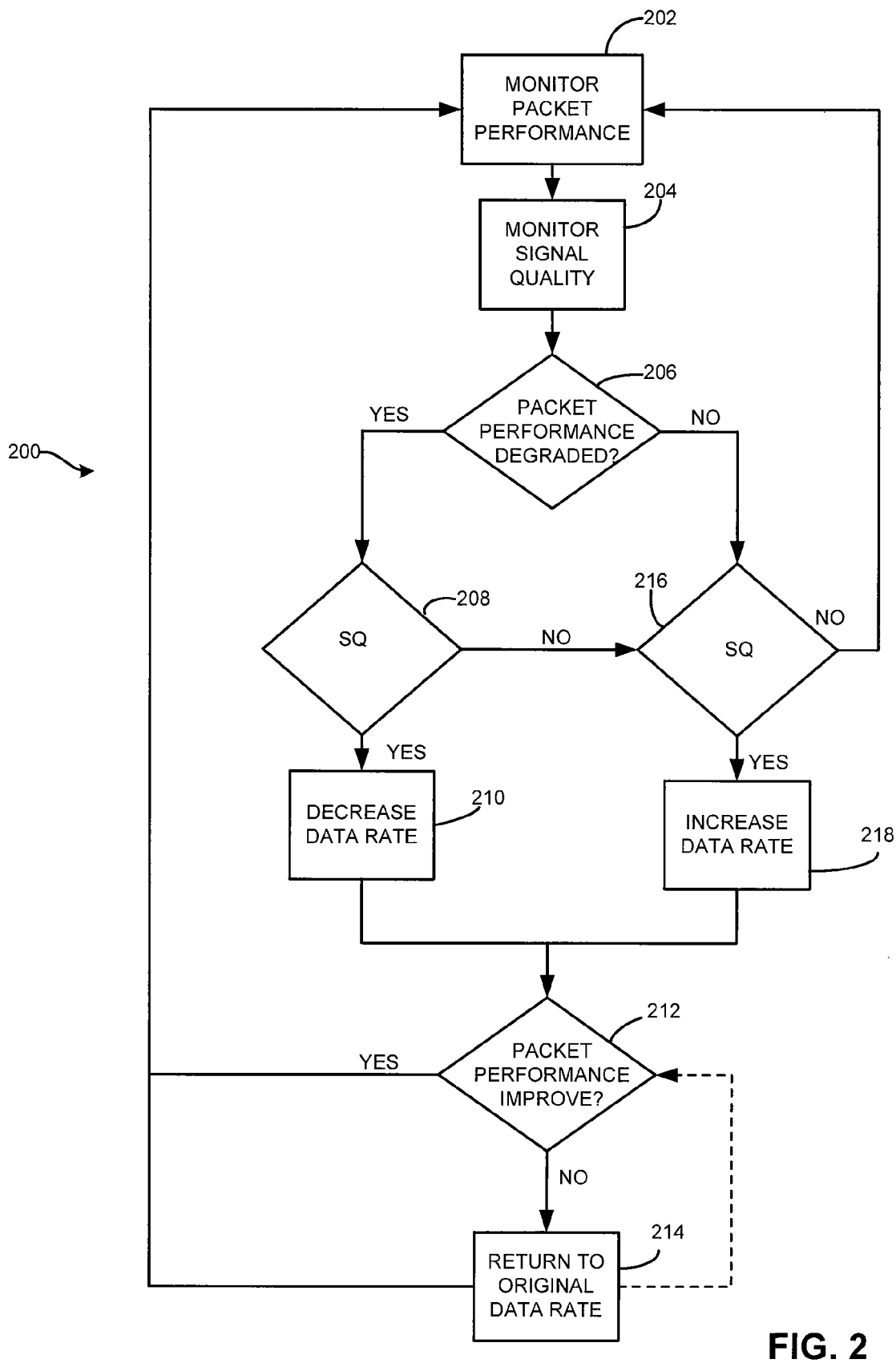
FIG. 2 is a block diagram of a method that can also increase data rate when signal quality improves in accordance with an aspect of the present invention.

FIGS. 1 and 2 illustrate methodologies in accordance with various aspects of the present invention. Although these methodologies are illustrated as executing sequentially, this is merely for illustrative purposes only and the methodologies should not be construed as being required to execute one step at a time as several steps of the methodologies can be executing simultaneously. Also, the methodologies are shown executing in a particular sequence, however except where explicitly stated, the methodology should not be construed to be limited to the sequence as shown.

Referring to FIG. 1, there is illustrated a block diagram of a method 100 in accordance with an aspect of the present invention. The method monitors the performance of a link and signal quality of the link to determine whether a rate shift is appropriate. At 102, the method monitors the performance of a communication link. This can be accomplished by monitoring a specified performance parameter such as throughput and/or packet loss rate. At 104, it is determined if the performance is degraded. Performance can be considered degraded by an increase in the packet loss rate, a decrease in throughput, or both. If no performance degradation is observed, then the method 100 returns to monitoring the performance of the communication link at 102.

At 106, the method 100 is monitoring signal quality, link quality and signal strength. This can occur at the same time as monitoring the link is performed at 102. There are several possible ways to monitor signal quality. Signal quality differs from the link performance because link performance is concerned with the amount of data being handled by the link whereas signal quality is concerned with the quality of received signals. One method for determining signal quality is by measuring the received signal strength of received packets. If the method is being implemented on an orthogonal frequency domain modulation (OFDM) system, then the signal quality can be determined by obtaining the link estimate from the synchronization preamble (802.11a) of received packets, or alternatively a Fourier Transform of the link estimate, to ascertain the impulse response of the link. Given that the link estimate is available it is possible to compute the coherence bandwidth of the link which is a measure of the link quality. The coherence bandwidth of the link can be determined form the following frequency correlation function $$\phi(n) = \frac{\sum_{k=n+1}^{N} H_k H_{k-n}}{\sum_{k=n+1}^{N} |H_k|^2}$$

where N is the total number of subcarriers, k is the frequency bin number and $H_k$ is the frequency response of the link at the k'th bin. The width of this function can be used to set a threshold for link quality since it is a measure of the quality of the link.

Another method of determining the link quality is to measure the flatness of the link frequency response. The flatter the response the better the link, In this case an average of the link's frequency response and find the minimum mean squared error.

$$H_{Avg}^2 = \sum_{k=m}^{N-m} |H_k|^2$$

$$Error_{rms} = \frac{1}{N} \sum_{k=m}^{N-m} |H_{Avg}^2 - |H_k|^2|$$

where m is an integer small compared to N needed so that the components near the edge are ignored since they are not flat. This $Error_{rms}$ can be compared to a desired value that is used as a threshold.

Figure 5:
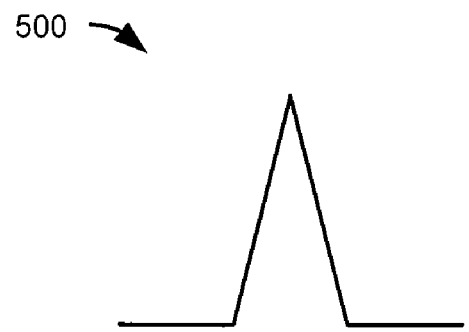
FIG. 5 is an exemplary illustration of a signal quality response.
Figure 6:
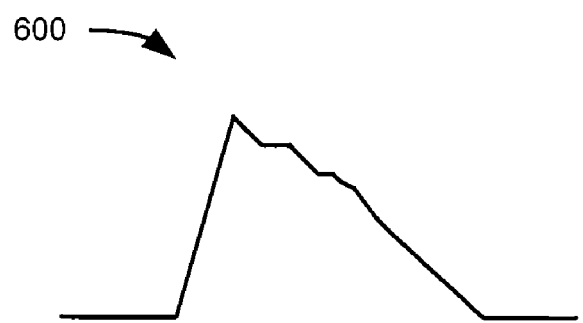
FIG. 6 is another exemplary illustration of a signal quality response.

Referring to FIGS. 5 and 6, FIG. 5 is an example of an Inverse Fourier Transform 500 of a channel exhibiting a good impulse response whereas FIG. 6 is an example of an Inverse Fourier Transform 600 of a channel having a worse response than the transform 500 illustrated in FIG. 5. The impulse response can be degraded because of multi-path, noise, or other causes of interference. As another example of determining signal quality for an OFDM channel, an autocorrelation of packets received can be performed to determine the frequency coherence of the channel. Or an determination of the width of the correlation peak could be used to estimate the amount of multipath. The wider the peak is from normal the worse the multipath. As another example, the signal quality for a direct sequence spread spectrum (DSSS) system can be determined from the width of the Barker Correlation peak of the channel. This can also be done for complementary code keying (CCK). The Barker correlation is found by correlating the incoming signal against the Barker sequence. The CCK correlation peak is found by correlating the received signal against a perfect reconstruction of itself.

If at 104 it is determined that the performance of the channel has degraded, then at 108 it is determined if signal quality has degraded. If the signal quality has not degraded, then it is likely that the cause of the performance degradation observed at 104 is due to packet collisions. If the cause of performance degradation is due to an increase in packet collisions, then decreasing the data rate can be counterproductive because decreasing the data rate increases the amount of time it takes to transmit a packet increasing the likelihood of a collision. Therefore, if at 108 the channel is not degraded, the data rate is not decreased and the method 100 returns to 102 and continues to monitor channel performance. However, if at 108 it is observed that the signal quality of the channel has degraded, then it is likely that a lower data rate can improve performance, so if the signal quality has degraded the method continues to 110. At 110, the data rate of the channel is decreased to a lower data rate. At 112, the performance of the channel at the lower data rate is compared to the performance at the original data rate. At 114, if the result of the comparison at 112 reveals that performance (e.g., packet loss or throughput) has improved, then the method returns to 102 to continue to monitor performance of the channel. If at 114 it is determined that performance did not improve, then at 116 the data rate is returned to the original data rate. Alternatively, at 116 the data rate can be changed to a data rate that is between the original data rate and the decreased data rate.

In accordance with an aspect of the invention, the method 100 can employ a Bayesian based machine learning method for implementing the present invention. The Bayesian based machine employing two models to be compared, the first model is packet loss due to collisions and the second model is packet loss due to poor signal quality.

Bayes Rule can be written as:

$$P(M|D) = \frac{P(D|M)P(M)}{P(D)}.$$

This can be read as "the a posteriori probability of the model M given the data D, that is P(M|D), is the probability of the data given the model, that is P(D|M) times the prior probability of the model, that is P(M), divided by the probability of the data, that is P(D)." For the present invention there are two models, one where packet loss is dominated by collisions and one where packet loss is dominated by poor signal quality. The probability P(M|D) for each model is calculated and compared, the one with the highest probability is determined to be the one under which the communications link is operating. The probability P(M) can be taken to be last calculated probability P(M|D). The probability P(D|M) is the probability that one would expect a datum D given the model M. Thus, if the model was a collision based model the signal strength would not to expected to be too low and a low probability would be assigned if the signal strength was found to be low. This probability could change in a continuous manner as the signal strength changed continuously. This could be done for the other data as well. Using an agnostic approach, equal probabilities could be assigned to the various P(M)'s. The probability P(D) can be handled less rigorously since it is a common term to each of the a posteriori probabilities.

When the model depends on many data Bayes Rule is modified as follows.

$$P(M|D_1, \ldots, D_n) = \frac{P(D_1, \ldots, D_n|M)P(M)}{P(D_1, \ldots, D_n)}$$

where the $D_i$ are the various data which in the present invention can be the packet loss rate, throughput, channel quality and the signal strength (or any other parameter desired).

In accordance with an aspect of the invention, the method can continue to monitor signal quality after switching to the lower data rate. If signal quality improves, then the method can return to the original data rate and compare the channel performance. If channel performance improves after returning to the original data rate, then the method stays at the original data rate, otherwise the method can return to the lower data rate.

The performance and signal quality of the channel can be monitored on a unit by unit basis. For instance, a running total of packets lost can be maintained in order to generate a packet loss rate. A history can be maintained for use in determining if performance is improving or degrading at 104. Also, for each received packet, the RSSI and IFFT and other signal quality parameters can be measured. A signal quality history can be maintained and employed at 108 to compare current signal quality parameters to previous measurements to continually determine if signal quality is decreasing.

At 114, a threshold value can be set for determining whether performance has improved a specific amount. This can be useful in preventing the method from constantly changing data rates. For example, if the packet loss rate is the same as it was before changing to the lower data rate, worse that it was before changing to the lower data rate, or only slightly improved (e.g., a less than 20% increase), then at 114 performance will not be considered to have improved and the method will continue to 116 and return the data rate to the original data rate. Optionally, the threshold values for determining when to switch data rates can be different for each data rate. For example at a high data rate the threshold value can be a 5% change whereas for a lower data rate the threshold rate can be a 10% change, or visa-versa.

In accordance with an aspect of the invention, the method 100 can be employed to change data rates between individual communication devices as opposed to all devices on a communication channel. For example, an access point can use the method 100 to determine the optimal data rate for each wireless station in its service set. Thus if the access point is sending a unicast packet destined for a single wireless station, the access point can send the unicast message at the maximum data rate for that wireless station.

When sending a multicast or broadcast message, the access point can use the data rate for the slowest wireless station in the group.

FIG. 2 is a block diagram of a method 200 that can also increase data rate when signal quality improves in accordance with an aspect of the present invention. The method 200 illustrated in FIG. 2 decreases the data rate when the link performance and signal quality have degraded, and has the additional capability to increase the data rate if the signal quality improves.

At 202, packet performance is monitored. The packet loss rate and/or throughput may be monitored to determine the packet performance. A memory can be used to store historical data to track packet performance to determine whether the packet performance is improving or degrading. At 204, signal quality is monitored. The signal quality can be determined by any one or more of a variety of techniques. For example, signal quality can be determined is by measuring the received signal strength of received packets. If the method is being implemented on an OFDM system, then the signal quality can be determined by obtaining an channel frequency response of the synchronization preamble of received packets, or alternatively an Fast Fourier Transform of the channel response can be made, to ascertain the impulse response of the channel. Referring to FIGS. 5 and 6, FIG. 5 is an example of a Fourier Transform of the channel frequency response 500 of a channel exhibiting a good impulse response whereas FIG. 6 is an example of an Fourier Transform of the channel frequency response 600 of a channel having a worse response than the transform 500 illustrated in FIG. 5. The impulse response can be degraded because of multi-path, noise, or other causes of interference. (As another example of determining signal quality for an OFDM channel, an autocorrelation of packets received can be performed to determine the frequency coherence of the channel. As another example, the signal quality for a direct sequence spread spectrum (DSSS) system can be determined by obtaining the Barker Correlation peak of the channel can be obtained as explained previously herein. This can also be done for complementary code keying (CCK). The Barker correlation is found by correlating the incoming signal against the Barker sequence. The CCK correlation peak is found by correlating the received signal against a perfect reconstruction of itself.

At 206, if packet performance has been degraded, then the method goes to 208 where it is determined if signal quality has degraded. If it has been determined at 206 packet performance has degraded and at 208 signal quality has been degraded, then at 210 the data rate is decreased to a lower data rate. At 212, the packet performance rate at the decreased rate is compared to the packet performance rate before the data rate was decreased. If the packet performance rate improved, then the data rate stays at the lower data rate. However, if at 212, it is determined that the packet performance rate did not improve, e.g., the rate either stayed about the same or even decreased, then at 214 the data rate is returned to the original data rate. Alternatively, at 214, the data rate can be shifted to a data rate that is between the lower data rate and the original data rate, in which case 212 and 214 can perform repeated iterations until the best data rate is obtained.

If at 208 it is determined that signal quality has not degraded, then the data rate will not be decreased. This is because it is quite likely that the reason for degradation in packet performance is being caused by collisions, in which case reducing the data rate could exacerbate the problem. Decreasing the data rate causes the length of time to transmit a packet to increase, and would thus cause each packet to occupy more time as its being transmitted, and increase the likelihood of collisions. Therefore, if at 208 it has been determined that the signal quality has not degraded, processing continues at 216. At 216, it is determined if the signal quality improved. If at 216 signal quality improved, then at 218 the data rate is increased to a higher data rate. At 212, packet performance is compared with the packet performance before the data rate was increased. If at 212 it is determined that packet performance improved, then the data rate remains at the increased data rate and continues to monitor packets at 202. If at 212 the packet performance rate did not improve, then at 214 the data rate is returned to the original higher data rate. Alternatively, at 214 the data rate can be a rate between the original data rate and the higher data and 212 and 214 can perform successive iterations until an optimal data rate is discovered.

If at 216 the signal quality did not improve, then the data rate is not changed. Packet performance continued to be monitored at 202.

The performance and signal quality of the link can be monitored on a packet by packet basis. For instance, a running total of packets lost can be maintained in order to generate a packet loss rate. A history can be maintained for use in determining if performance is improving or degrading at 202. Also, for each received packet, the RSSI and IFFT, FFT and other signal quality parameters can be measured. A signal quality history can be maintained and employed at 204 to compare current signal quality parameters to previous measurements to continually determine if signal quality is decreasing.

At 212, a threshold value can be set for determining whether performance has improved a specific amount. This can be useful in preventing the method from constantly changing data rates. For example, if the packet loss rate is the same as it was before changing to the lower data rate, worse that it was before changing to the lower data rate, or only slightly improved (e.g., a less than 20% increase), then at 212 performance will not be considered to have improved and the method will continue to 214 and return the data rate to the original data rate. Optionally, the threshold values for determining when to switch data rates can be different for each data rate. For example at a high data rate the threshold value can be a 5% change whereas for a lower data rate the threshold rate can be a 10% change, or visa-versa. The threshold values can be set to prevent excessive rate changes.

In accordance with an aspect of the invention, the method 200 can be employed to change data rates between individual communication devices as opposed to all devices on a communication channel. This can be useful because in large networks some communication devices may be in areas having high noise or multipath issues while others are receiving good signals. For example, an access point can use the method 200 to determine the optimal data rate for each wireless station in its service set. Thus if the access point is sending a unicast packet destined for a single wireless station, the access point can send the unicast message at the maximum data rate for that wireless station. When sending a multicast or broadcast message, the access point can use the data rate for the slowest wireless station in the group.

Figure 3:
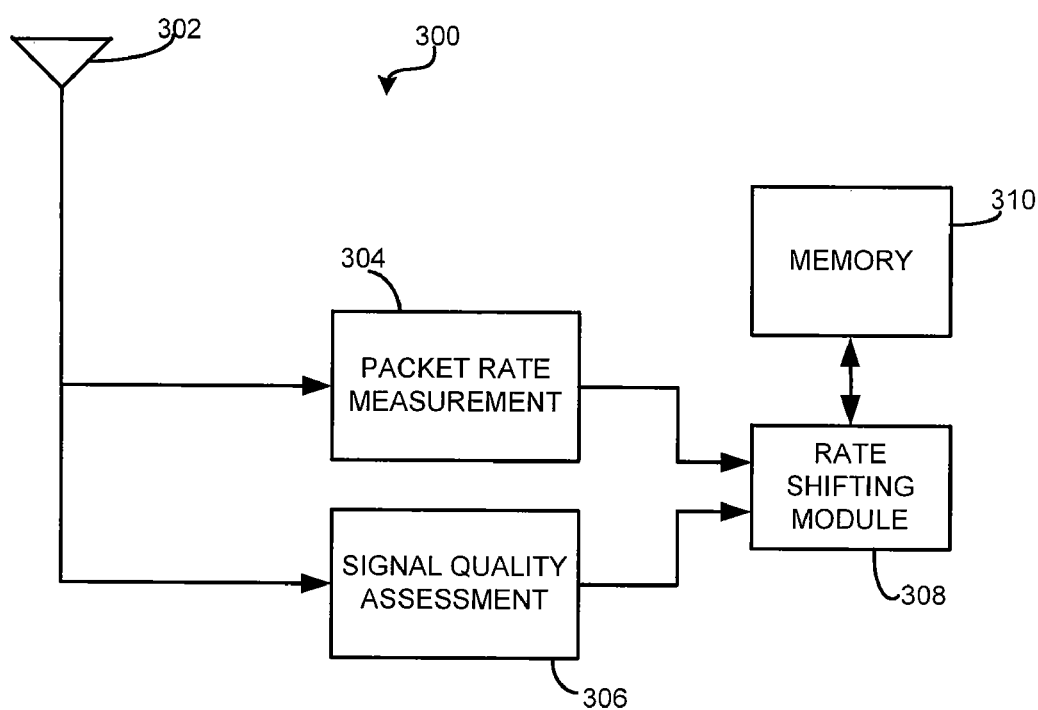
FIG. 3 is a block diagram of a communication device in accordance with an aspect of the present invention.

FIG. 3 is a block diagram 300 of a communication device in accordance with an aspect of the present invention. The communication device would have a pre-determined data rate for communicating. The communication device can start at its highest data rate and negotiate until it reaches an optimal data rate for the network, which would then become its pre-determined data rate. An antenna 302 receives signals and forwards the signals to the packet rate measurement module 304 and the signal quality assessment module 306. The packet rate measurement module 304 determines whether the packet loss rate is increasing or decreasing, or alternatively, whether throughput is increasing or decreasing. The signal quality assessment module 306 determines the signal quality of successfully received packets. Signal quality can be determined by a variety of factors, which can be used individually or combined with other factors. For example, signal quality can be determined is by measuring the received signal strength of received packets. If the method is being implemented on an OFDM system, then the signal quality can be determined by obtaining an channel frequency response of the synchronization preamble of received packets, or alternatively an Fast Fourier Transform of the channel response can be made, to ascertain the impulse response of the channel. Referring to FIGS. 5 and 6, FIG. 5 is an example of a Fourier Transform of the channel frequency response 500 of a channel exhibiting a good impulse response whereas FIG. 6 is an example of an Fourier Transform of the channel frequency response 600 of a channel having a worse response than the transform 500 illustrated in FIG. 5. The impulse response can be degraded because of multi-path, noise, or other causes of interference. As another example of determining signal quality for an OFDM channel, an autocorrelation of packets received can be performed to determine the frequency coherence of the channel. As another example, the signal quality for a direct sequence spread spectrum (DSSS) system can be determined by obtaining the Barker Correlation peak of the channel can be obtained as explained previously herein. This can also be done for complementary code keying (CCK). The Barker correlation is found by correlating the incoming signal against the Barker sequence. The CCK correlation peak is found by correlating the received signal against a perfect reconstruction of itself.

The output of the packet rate measurement module 304 and the signal quality assessment 306 are input into the rate shifting module 308. The rate shifting module is configured to decrease the data rate of the communication device after detecting an increased packet loss rate and decreased link quality. Rate shifting module 308 can have an associated memory 310 for a history of packet rate measurements and signal quality assessments in order to determine when the packet rate is degrading or improving, and likewise whether the signal quality is improving or degrading. Memory 310 can be configured to store packet rate and signal quality date for other communication devices that communication device 300 is in communication. An aspect of the present invention is that it can be implemented in base stations such as access points or in mobile units such as wireless stations. The pack rate measurement module 304, signal quality assessment module 306 and the rate shifting module 308 can be implemented in hardware, software, or a combination of software and hardware.

Figure 4:
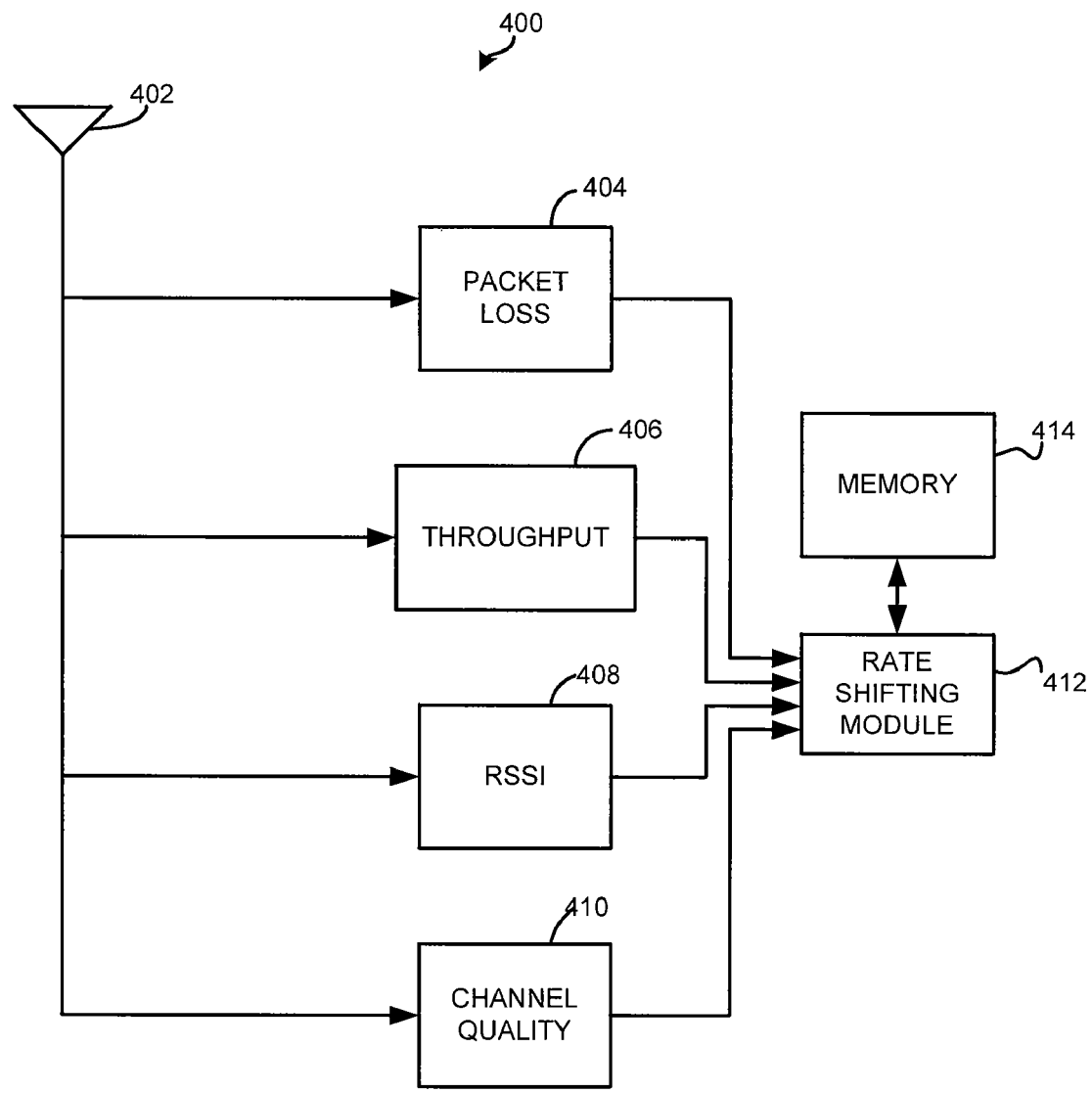
FIG. 4 is a detailed block diagram of a communication device in accordance with an aspect of the present invention.

FIG. 4 is a detailed block diagram of a communication device 400 in accordance with an aspect of the present invention. The communication device can be communicating with one or more other communications devices at a predetermined data rate, or can be communicate with the other communication devices using a separate predetermined data rate for each of the other devices.

Antenna 402 receives a signal from the an other communication device (not shown). The signal is forwarded to packet loss module 404, throughput module 406, RSSI module 408 and Channel Quality module 410. The aforementioned modules can be implemented in either software, hardware or a combination of software and hardware. Packet loss module 404 determines the packet loss rate. Throughput module 406 determines the effective throughput of the channel. RSSI module 408 determines the received signal strength of the signals received by antenna 402. Channel quality module 410 determines the quality of the channel from signals received by antenna 402 by means other than received signal strength. The signal quality can be determined by any one or more of a variety of techniques. For example, signal quality can be determined is by measuring the received signal strength of received packets. If the method is being implemented on an OFDM system, then the signal quality can be determined by obtaining an channel frequency response of the synchronization preamble of received packets, or alternatively an Fast Fourier Transform of the channel response can be made, to ascertain the impulse response of the channel. Referring to FIGS. 5 and 6, FIG. 5 is an example of a Fourier Transform of the channel frequency response 500 of a channel exhibiting a good impulse response whereas FIG. 6 is an example of an Fourier Transform of the channel frequency response 600 of a channel having a worse response than the transform 500 illustrated in FIG. 5. The impulse response can be degraded because of multi-path, noise, or other causes of interference. (As another example of determining signal quality for an OFDM channel, an autocorrelation of packets received can be performed to determine the frequency coherence of the channel. As another example, the signal quality for a direct sequence spread spectrum (DSSS) system can be determined by obtaining the Barker Correlation peak of the channel can be obtained as explained previously herein. This can also be done for complementary code keying (CCK). The Barker correlation is found by correlating the incoming signal against the Barker sequence. The CCK correlation peak is found by correlating the received signal against a perfect reconstruction of itself.

Rate shifting module 412 receives the outputs from packet loss module 404, throughput module 406, RSSI module 408 and Channel Quality module 410. Rate shifting module 412 can be implemented in hardware, software, or a combination of hardware and software. Rate shifting module 412 determines when to increase or decrease the data rate based on the data received from packet loss module 404, throughput module 406, RSSI module 408 and Channel Quality module 410. In accordance with an aspect of the invention, rate shifting module 412 can be configured to decrease the data rate after detecting either an increase in packet loss or a throughput and detecting a decrease in one or more of the received signal strength and channel quality. The data rate is decreased because it can be inferred that the reason for the increased packet loss, or decrease in throughput, is due to the corresponding decrease in channel quality or the received signal strength.

In accordance with an aspect of the invention, rate shifting module 412 can be configured not to decrease the data rate after detecting either an increase in packet loss or a throughput if it does not detect a corresponding decrease in at least one of the received signal strength and channel quality. When this situation occurs, data rate module 412 can infer that the reason for the increased packet loss, or decrease in throughput, is due to an increase in collisions. When an increase in packet loss is caused by an increase in collisions, then decreasing the data rate is counterproductive and may actually exacerbate the problem.

In accordance with another aspect of the invention, rate shifting module 412 can be configured to increase the data rate if at least one of an increase in received signal strength and an increase in channel quality is detected. An improvement in either or both of the received signal strength and the channel quality can indicate a condition that existed before to cause the channel to deteriorate has been removed. For example a source of multipath or noise interference may have moved, or the other communication device moved away from the source. This can improve the packet loss rate because packets occupy the channel for a smaller amount of time at higher data rates, consequently reducing the likelihood of collisions.

Rate shifting module 412 can employ memory 414 to maintain historical data. For example, memory 414 can have data of packet loss rates and/or throughput of a link before a rate is changed so that after the data rate is changed rate shifting module 412 can compare the packet loss rate or throughput after the data rate is changed to determine if the change was effective. If the change was not effective, or if in fact the change made the situation worse, then rate shifting module 412 can return to the original data rate. Memory 414 can also store RSSI and channel quality data to enable rate shifting module 412 to determine changes in channel or signal quality. Also, memory 414 can be used to store historical data for other communication devices individually enabling communication device 400 to communicate with another device at the optimal data rate for that particular device.

The foregoing description of the invention has been presented for purposes of illustration and description. It is not intended to be exhaustive or to limit the invention to the precise form disclosed. Obvious modifications or variations are possible in light of the above teachings. Although the present invention has been described primarily with reference to spread spectrum wireless communication systems, the present invention can also be suitably adapted to other wireless communication systems as well as wired communications systems. All such modifications and variations are within the scope of the invention as determined by the appended claims when interpreted in accordance to the breadth to which they are fairly, legally and equitably entitled.

What is claimed is:

1. A method to optimize communications, comprising:
    monitoring a performance parameter of a channel, the performance parameter being at least one selected from the group of throughput rate and packet rate loss;
    monitoring signal quality;
    switching to a lower data rate after the performance parameter indicates a decrease in performance and the signal quality has degraded;
    continuing to monitor the performance parameter after switching to the lower data rate;
    comparing the performance parameter after switching to the lower data rate with the performance parameter before switching to the lower data rate; and
    switching to a higher date rate after the comparison determines that the performance parameter after switching to the lower data rate did not improve by a predetermined threshold;
    wherein the performance parameter that indicates a decrease in performance is at least one of the throughput rate decreasing and the packet loss rate increasing.

2. The method of claim 1, wherein the signal quality comprises measuring received signal strength of a received packet.

3. The method of claim 2, further comprising comparing the measured received signal strength with a previously measured received signal strength.

4. The method of claim 1, wherein the signal quality comprises obtaining an inverse Fourier transform of a packet to determine the impulse response of the channel.

5. The method of claim 1, wherein the signal quality comprises performing an autocorrelation of the channel to determine the frequency coherence of the channel.

6. The method of claim 1, wherein the signal quality comprises obtaining a Barker Correlation peak.

7. The method of claim 1, wherein the higher data rate is the same as a data rate before switching to the lower data rate.

8. The method of claim 1, wherein the monitoring a performance parameter of a channel, and the monitoring signal quality is performed on a unit by unit basis.

9. The method of claim 1, further comprising:
    switching to a higher data rate when the performance parameter indicates the signal quality has improved.

10. A method for optimizing communications, comprising:
    maintaining a history of signal quality of a successfully received packet with a data rate;
    maintaining a history of received signal strength of the successfully received packet;
    maintaining a history of packet loss rate;
    switching to a lower data rate after the history of packet loss rate indicates an increase in a rate of packets lost and at least one of a signal quality of a later received successfully received packet is a first predetermined threshold level below the signal quality of the successfully received packet, and a received signal strength of the later received successfully received packet is less than the received signal strength of the successfully received packet by a second predetermined threshold level.

11. The method of claim 10, further comprising:
    comparing the packet loss rate of the lower data rate to the history of the packet lost rate; and
    switching to a higher data rate after determining the packet loss rate of the lower data rate is greater than a predetermined threshold.

12. The method of claim 10, wherein the signal quality comprises obtaining an inverse Fourier transform of packet to determine the impulse response of a channel.

13. The method of claim 10, wherein the signal quality comprises performing an autocorrelation of a channel to determine the frequency coherence of the channel.

14. The method of claim 10, wherein the signal quality comprises obtaining a Barker Correlation peak.

15. The method of claim 10, further comprising:
    switching to a higher data rate when a performance parameter indicates the signal quality has improved.

16. The method of claim 10, wherein a data rate can vary by individual communication device, the maintaining a history of signal quality of a successfully received packet is maintained by individual communication device, the maintaining a history of received signal strength of the successfully received packet is maintained by individual communication device, and the maintaining a history of packet loss rate is maintained by individual communication device.

17. A communication device, comprising:
    means for measuring packet loss rate;
    means for monitoring signal quality; and means for changing a data rate responsive to the means for measuring packet loss rate and the means for monitoring signal quality;

wherein the means for changing a data rate changes the data rate to a lower data rate responsive to the means for measuring packet loss rate indicating an increased packet loss rate and the means for monitoring signal quality indicating a degradation in signal quality;

wherein the means for measuring packet loss rate further comprises a first memory means for maintaining packet loss rate history;

wherein the means for changing a data rate compares packet loss rate history after changing to the lower data rate with the packet loss rate history before changing to the lower data rate; and wherein the means for changing a data rate responsive to change the data rate to a higher data rate responsive to the packet loss data rate of the lower data rate being greater than a predetermined threshold.

18. The communication device of claim 17, wherein the predetermined threshold is the packet loss rate before changing to the lower data rate.

19. An apparatus, comprising:
a packet rate measuring module configured to monitor a performance parameter, the performance parameter is at least one selected from a group consisting of throughput rate and packet rate loss;
a signal quality assessment module; and
a rate shifting module coupled to the packet rate measuring module and the signal quality assessment module;
wherein the rate shifting module is configured to switch to a lower data rate responsive to the performance parameter indicating a decrease in performance and the signal quality assessment module indicates a decrease in signal quality;
where the rate shifting module is configured to continue monitoring the performance parameter after switching to the lower data rate;
wherein the rate shifting module is configured to compare the performance parameter with the performance parameter after switching to the lower data rate;
wherein the rate shifting module is configured to switch to a higher data rate responsive to determining that the performance parameter after switching to a lower data rate did not improve by a predetermined threshold; and
wherein the performance parameter that indicates a decrease in performance is at least one of the throughput rate decreasing and the packet loss rate increasing.

20. The apparatus of claim 19, wherein the signal quality assessment module measures a received signal strength of a received packet.

21. The apparatus of claim 20, wherein the rate shifting module is configured to compare the measured received signal strength of a packet received after switching to the lower data rate with a received signal strength measured before switching to the lower date rate.

22. The apparatus of claim 19, wherein the signal quality assessment module is configured to obtain an inverse Fourier transform of a packet to determine the impulse response of a channel.

23. The apparatus of claim 19, wherein the signal quality assessment module performs an autocorrelation of a channel to determine frequency coherence of the channel.

24. The apparatus of claim 19, wherein the signal quality assessment module obtains a Barker Correlation peak.

25. The apparatus of claim 19, wherein the higher data rate is the same as a data rate before switching to the lower data rate.

26. The apparatus of claim 19, wherein the rate shifting module is configured to switch to a higher data rate when the performance parameter indicates the signal quality has improved.

27. An apparatus, comprising:
a channel quality module;
a received signal strength module configured to determine the signal strengths of received signals;
a packet loss module configured to determine packet loss rate;
a rate shifting module coupled to the channel quality module, received signal strength module and the packet loss module;
wherein the rate shifting module is configured to maintain a history of signal quality of a successfully received packet with a data rate;
wherein the rate shifting module is configured to maintain a history of received signal strength of the successfully received packet;
wherein the rate shifting module is configured to maintain a history of packet loss rate; and
wherein the rate shifting module is configured to switch to a lower data rate responsive to the history of packet loss rate indicating an increase in a rate of packets lost and at least one of a signal quality of a later received successfully received packet is a first predetermined threshold level below the signal quality of the successfully received packet, and a received signal strength of the later received successfully received packet is less than the received signal strength of the successfully received packet by a second predetermined threshold level.

28. The apparatus of claim 27, wherein the rate shifting module is configured to compare the packet loss rate of the lower data rate to the history of the packet lost rate; and
wherein the rate shifting module is configured to switch to a higher data rate upon determining the packet loss rate of the lower data rate is greater than a predetermined threshold.

29. The apparatus of claim 27, wherein the channel quality module is configured to obtain an inverse Fourier transform of packet to determine the impulse response of a channel.

30. The apparatus of claim 27, wherein the channel quality module is configured to perform an autocorrelation of a channel to determine the frequency coherence of the channel.

31. The apparatus of claim 27, wherein the channel quality module is configured to obtain a Barker Correlation peak.

32. The apparatus of claim 27, wherein the rate shifting module is further configured to switch to a higher data rate when a performance parameter indicates the signal quality has improved.

33. The apparatus of claim 27, further comprising a throughput module configured to determine an effective throughput of a channel coupled to the rate shifting module.

* * * * *